Figure 1:
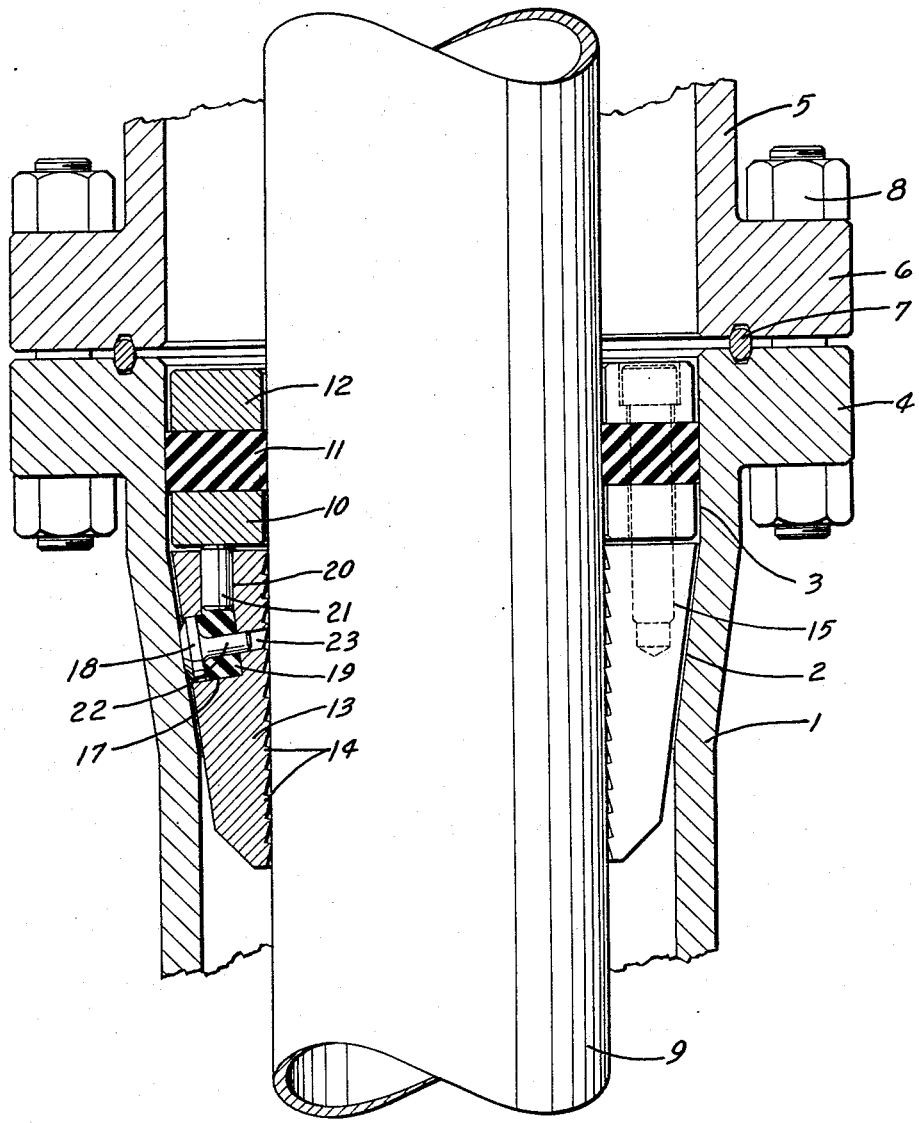

HERBERT ALLEN
*INVENTOR.*

July 6, 1954 H. ALLEN 2,683,047
PIPE HANGER AND SEAL ASSEMBLY

Original Filed March 30, 1950 2 Sheets-Sheet 2

HERBERT ALLEN
*INVENTOR.*

BY *Browning & Simms*
*Attorneys.*

Patented July 6, 1954

2,683,047

UNITED STATES PATENT OFFICE 2,683,047

PIPE HANGER AND SEAL ASSEMBLY

Herbert Allen, Houston, Tex., assignor to Cameron Iron Works, Inc., Houston, Tex., a corporation of Texas Continuation of abandoned application Serial No. 152,912, March 30, 1950. This application June 9, 1953, Serial No. 360,525

4 Claims. (Cl. 285—22)

This invention relates in general to pipe hanging and sealing apparatus and has for its general object the provision of such an apparatus which will become fully and automatically effective upon being lowered into position about a pipe and the weight of the pipe released thereon.

This application is a continuation of my prior application Serial Number 152,912, now abandoned, filed in the United States Patent Office on March 30th, 1950.

It is often desirable in completing a well to hang and provide a seal about the outside of an inner string of pipe prior to the removal of the control equipment, such as blowout preventers and the like, which are customarily employed on a well above the casing or tubing head. Various means have in the past been proposed for performing this function, but such means have either required special types of casing or tubing heads, which, unless the operator had foreseen the necessity for the particular types of hanging and sealing device employed, would probably not be in place on the well, or have required that the pipe be hung at a collar or special section of pipe which would provide a downwardly facing shoulder on the exterior of the pipe. In still other instances, suggestions have involved the provision of a tapered bowl forming part of the mechanism separate from the casing or tubing head, and such a bowl, as will be appreciated, is an expensive item to manufacture.

In those previous devices which have purported to provide seals automatically upon hanging of the pipe, some have provided for the entire weight of the pipe to rest on the seals to expand the same, a situation which in some cases may result in damage to the pipe being hung, and in other cases such devices have relied upon what is customarily known as a lip type seal, which is effective against pressure in but one direction.

It is an object of this invention to provide a device of the type referred to which will not require any special well head equipment other than the hanging and sealing device itself, and will not require any special element to be incorporated in the pipe nor require the pipe to be hung at any specified point.

Another object of this invention is to provide a pipe hanger and seal assembly which will be simple to manufacture and yet efficient and dependable in operation.

Another object is to provide a pipe hanger and seal assembly which will require no special machine operations in its manufacture except simple operations which may be performed on a drill press, lathe, and saw.

Other objects and advantages of this invention will become apparent from the following description taken in connection with the accompanying drawings wherein is set forth by way of illustration and example one embodiment of the invention.

Figure 2:
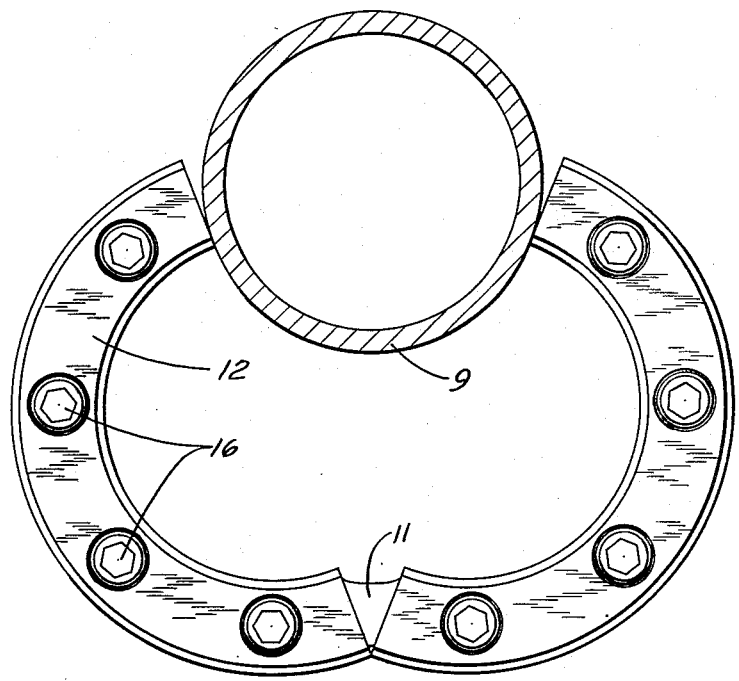

In the drawings:

Fig. 1 is a view illustrating in longitudinal cross-section a pipe being hung and a tapered bowl type casing head of ordinary construction in which it is being hung, the pipe hanger and seal assembly being illustrated in longitudinal cross-section, and the parts occupying the position which they would assume shortly after the pipe hanger and seal assembly had reached its position in the casing head and during the actual hanging of the casing and the formation of the seal; and Fig. 2 is a view in plan of a pipe hanger and seal assembly such as shown in Fig. 1, being placed around a pipe to be hung, the pipe being shown in horizontal cross-section.

Referring now more in detail to the drawings, the numeral 1 indicates a casing head of conventional construction having a tapered zone 2 on its interior, such taper converging in a downward direction, and having a substantially cylindrical zone 3 on its interior above the tapered zone 2. This casing head is provided with a flange 4 extending outwardly from its upper end for the purpose of securing it to a suitable fitting to be connected thereto, the lower portion of such fitting being indicated by the numeral 5 in Fig. 1. The fitting 5 may be a blowout preventer valve, or other suitable fitting, and is provided with a flange 6 matching the flange 4 on a casing head. Between these two fittings, the casing head 1, and the fitting 5, there is interposed a customary type seal ring 7 so that when the flanges 4 and 6 are drawn together by bolts 8, the two fittings will be completely sealed to each other.

Located within the casing head 1 and to be hung in such head and sealed thereto is a pipe 9 which may be an inner string of well casing and which may extend upwardly from the casing head through suitable control equipment such as blowout preventers, valves, and the like.

The hanging and sealing assembly to which this invention relates is made up of a packing holding ring 10, and annular distortable packing 11, a packing compressing ring 12, and a ring of slip segments 13.

The packing holding ring 10 is illustrated as being located above the ring of slip segments 13 and, in the manner which will presently be explained, is supported against movement with the slip segments when the slip segments move downwardly in the bowl into a firmer seating engagement with the tapered zone 2. The slip segments 13 are provided with tapered outer surfaces to fit in the tapered zone 2 of the casing head, and on their inner surfaces are provided with upwardly directed gripping teeth 14 adapted to engage and grip the pipe 9.

Each of the segments 13 is tapped in its upper surface at 15 to receive a cap screw 16 or the like, which passes through the holding ring 10 and the distortable packing 11, as well as the packing compressing ring 12, so as to secure all these parts together in a unitary assembly. The packing holding ring 10 and compressing ring 12 provide a packing confining means by which the packing 11 is confined.

Each of the segments 13 is also provided on its outer surface with one or more recesses 17 adapted to receive plungers or pistons 18 which have parts projecting outwardly from the outer surfaces of the segments and which parts provide yieldable parts adapted to yield under pressure toward the regular outer contour of the segments.

Behind each of the plungers 18 within the recesses 17 there is disposed a block 19 of resilient material such as rubber which is yieldable and flowable but preferably substantially incompressible. Connecting with that portion of the recess 17 in which the rubber block 19 or the like is disposed, is an upwardly extending bore 20 in which is disposed a plunger 21. The bore 20 provides a relief passage for the flow of material of the resilient block 19 when the plunger 18 is forced inwardly, and the plunger 21 serves to transmit this relief movement of the material of the block 19 into a force exerted against the packing holding ring or gland ring 10 so that as the slip segments 13 move downwardly and the plungers 18 are moved inwardly, the packing holding ring will be forced away from the slip segments and prevented from moving with them, while the packing compressing ring or gland 12, being tied to the slip segments by means of the cap screws 16, will be forced to move downwardly with the slip segments, thereby moving the two gland rings toward each other and causing compression longitudinally of the packing ring 11, with its consequent lateral expansion into sealing engagement with the interior of the casing head 1 and the exterior of the pipe 9.

It will be noted that each of the plungers 18 has a guiding stem 22 thereon which is mounted to reciprocate within the small bore 23 at the inner extremity of the recess 17. This stem 22 not only serves to guide the plunger 18 and keep it properly disposed with respect to the slip segment at all times, but serves the further function of being frictionally engaged within an opening in the resilient block 19, which block in turn is resiliently and frictionally engaged within the recess 17, so that the plungers 18 will be retained in position prior to the setting of the assembly.

It will be appreciated that the packing holding ring 10, and the packing compressing ring 12 may both be made in two parts, which complement each other to form these respective annular rings. These parts are split from each other in a longitudinal direction so that each makes up substantially one-half of an annular member. The distortable packing 11 is likewise split but only at one point, so that it consists of one integral flexible or distortable packing member. When the parts are assembled, one-half of the segments 13 may be assembled with respect to one of the halves of the packing compressing ring and one of the halves of the packing holding ring, and the other half of the segments are assembled with respect to the other half of the packing compressing ring and the other half of the packing holding ring. The annular distortable packing is so arranged that its one split portion registers with one of the divisions between the packing compressing ring parts and the packing holding ring parts, whereas this annular distortable packing bridges the other split or division between the packing compressing ring parts and the packing holding ring parts.

It will be seen that when all the parts are secured together as by the cap screws 16, the two segmental halves of the assembly will be joined together only at one side and only by the distortable packing which bridges the split between them. This distortable packing, being relatively easy to flex as compared with other parts of the assembly, may be made to serve as a hinge so that the two parts of the assembly may be moved away from each other and placed around a pipe as illustrated in Fig. 2.

It will be appreciated that the cap screws 16 are not tightened sufficiently to expand the distortable packing 11 but are merely for the purpose of holding the parts in assembled relation while they are being put in position in the well, and of tying the packing compressing gland ring 12 to the segments 13 to cause it to move with said segments.

It will now be assumed that the pipe 9 is an inner casing which has been run into a well through blowout preventers and other control equipment, and has reached the position where it is desired that it be hung and sealed. It will further be assumed that the well is in such condition that it is not desired that the space between the casing and casing head be left open for any substantial length of time because of the danger of a blowout. While the pipe 9 is being held in suspension by the hoisting apparatus employed in running the pipe, the assembly construction in accordance with this invention as above described will be placed about an intermediate portion of the pipe above the blowout preventers in the manner illustrated in Fig. 2. The blowout preventers will then be opened so as to permit this assembly to pass down along the pipe and land in the casing head as illustrated in Fig. 1. It will be seen that when the parts are in the position illustrated in Fig. 1, the packing holding ring or gland 10 will be supported upon the upper ends of the plungers 21. As these plungers will be moved out of the upper ends of the slip segments 13 upon downward movement of the slip segments, the packing holding ring or gland will be moved by these plungers away from the slip segments and prevented from downward movement with the slip segments. Also, it will be appreciated that the plungers 18 which provide yieldable parts on the outer surfaces of the slip segments, will have come in contact with the tapered portion of the casing head and will have forced the teeth 14 of the slip segments into contact with the pipe 9.

The weight of the pipe will then be eased off from the hoisting equipment and as this weight is taken off on the slip segments 13, these segments will begin to move downwardly, first biting into the pipe with the teeth 14, and then forcing the yieldable plungers 18 to move inwardly toward the regular outer contour of the segments. These plungers in such movement compress and distort the resilient blocks 19 and the distortion of the resilient blocks 19 causes the upward movement of the plungers 21 to prevent the packing holding ring 10 from moving with the slip segments. At the same time, the downward movement of the segments 13 will be transmitted by the cap screws 16 to the packing compressing ring 12 so that such packing compressing ring will be caused to move downwardly with the slip segments and compress the packing 11 in a longitudinal direction. This compression of the packing in a longitudinal direction will force the expansion of the packing laterally into sealing engagement with both the casing head 1 and the pipe 9.

It will be seen that the amount of compression of the packing will be limited by the fact that as soon as the yieldable projections provided by the plungers 18 have been moved inwardly to the regular contour of the segments 13, the downward movement of the segments will be halted and that any additional weight of pipe which is brought to rest on the segments will be transmitted directly by the segments to the casing head 1 and will not be imposed upon the packing 11. Thus, the amount of downward movement of the segments permitted by the yielding of the plungers 18 determines the degree to which the packing 11 will be compressed and the amount of weight to be placed on this packing.

After the device has been set in the manner just described, it will be appreciated that not only is the pipe hung, but that the space between the pipe and the casing head will be completely sealed off. Thereupon, the control equipment may be removed from the well without danger of blowout through the annular space and the well may then be completed in the usual manner.

If after removal of the control equipment it be found that the distortable packing has not been sufficiently compressed, or that it is felt that in the interest of safety additional compression of the packing is desirable, this may be accomplished merely by tightening up on the cap screws 16.

It will be appreciated that the device just described is so extremely simple that it may be made with only the simplest of machine operations. Thus, the slip segments 13 differ from ordinary slip segments only in the provision of the recess 17, the bore 23, and the passageway 20, all of which may be formed with drill press operations, and in the provision of the tapped openings for receiving the cap screws 16, which likewise are formed by simple drilling and tapping operation. The gland rings 10 and 12 are plain annular rings having holes drilled therethrough for the passage of the cap screws 16, the ring 12 being counterbored from its upper surface to receive the heads of the cap screws 16 so that they might lie flush with the upper surface of the ring 12. The rings 10 and 12 may be split in the manner hereinbefore described by the simple process of sawing them in two.

Thus, it will be seen that a means has been provided for carrying out and accomplishing the objects of this invention with a simple assembly which may be manufactured with a minimum of machine operations.

It is apparent that various modifications may be made in the device as described without departing from the spirit or scope of this invention as defined in the appended claims.

The invention having been described, what is claimed is:

1. A pipe hanger and seal assembly comprising a packing holding ring, an annular distortable packing thereon, a packing compressing ring on the opposite side of said packing from said holding ring and engageable with the packing to compress the same, a ring of slip segments having parts in engagement with said compressing ring to move said compressing ring axially in a direction toward said packing to compress the latter with movement of said segments, yieldable means carried by said slip segments and having parts initially projecting from the outer surfaces of said segments and then movable under pressure toward conformity with the regular outer contour of said segments, a force transmitting connection between said yieldable means and said holding ring urging the latter in a direction toward the packing upon movement of said yieldable means toward conformity with said contour of said segments, said yieldable means comprising plungers mounted in recesses in said segments and extending to provide said initially projecting parts and resilient means in said recesses behind said plungers urging said plungers toward their initially projecting position.

2. A pipe hanger and seal assembly comprising a packing holding ring, an annular distortable packing thereon, a packing compressing ring engaging the opposite side of said packing from said holding ring, a ring of slip segments having parts in engagement with said compressing ring to move said compressing ring axially in a direction toward said packing to compress the latter with movement of said segments, and yieldable means including plungers carried by said slip segments, said plungers initially projecting from the outer surfaces of the segments and movable under pressure toward conformity with the regular outer contours of said segments, said plungers being biased toward their initially projecting position and slidably mounted in recesses in said segments, and a force transmitting connection between the yieldable means and said holding ring causing relative movement between the holding ring and segments upon movement of the plungers toward conformity with said contour of said segments.

3. A pipe hanger and seal assembly comprising a packing holding ring, an annular distortable packing thereon, a packing compressing ring confining the opposite side of said packing from said holding ring, a ring of slip segments having parts in engagement with said compressing ring to move said compressing ring axially in a direction toward said packing with movement of said segments, yieldable parts carried by said slip segments and initially projecting from the outer surfaces thereof and movable under pressure toward conformity with the regular outer contours of said segments, said yieldable parts comprising plungers mounted in recesses in said segments and solid resilient blocks filling the recesses in said segments behind said plungers, said segments having relief passages communicating with the portions of said recesses which are filled by said blocks, and movable parts connected to the holding ring and extending into said passages to be moved by expansion of the blocks into the passages thereby causing relative movement between the holding ring and the segments.

4. A pipe hanger and seal assembly comprising a packing holding ring, an annular distortable packing thereon, a packing compressing ring confining the opposite side of said packing from said holding ring, a ring of slip segments having parts in engagement with said compressing ring to move said compressing ring axially with said segments, and yieldable parts carried by said slip segments and initially projecting from the outer surfaces thereof and movable under pressure inwardly toward conformity with the regular outer contours of said segments, said yieldable parts comprising plungers mounted in recesses in said segments and solid resilient blocks filling the recesses in said segments behind said plungers, said segments having upwardly directed relief passages communicating with the portions of said recesses which are filled by said blocks, and plungers in said passages movable under pressure from said blocks to engage said holding ring and prevent it from moving with said segments.

References Cited in the file of this patent

UNITED STATES PATENTS

| Number | Name | Date |
|---|---|---|
| 1,650,074 | Kammerdiner | Nov. 22, 1927 |
| 1,923,283 | Stokes | Aug. 22, 1933 |
| 2,073,890 | Tschappat | Mar. 16, 1937 |
| 2,118,094 | McDonough et al. | May 24, 1938 |
| 2,312,487 | Roach et al. | Mar. 2, 1943 |
| 2,493,556 | Stone | Jan. 3, 1950 |
| 2,553,838 | Allen et al. | May 22, 1951 |
| 2,600,257 | Neilon | June 10, 1952 |
| 2,610,689 | Eckel | Sept. 16, 1952 |
| 2,620,880 | Mueller et al. | Dec. 9, 1952 |